(12) United States Patent
Belmont

(10) Patent No.: US 10,329,454 B2
(45) Date of Patent: Jun. 25, 2019

(54) COMPOSITIONS COMPRISING SILANE MODIFIED METAL OXIDES

(71) Applicant: Cabot Corporation, Boston, MA (US)

(72) Inventor: James A. Belmont, Acton, MA (US)

(73) Assignee: Cabot Corporation, Boston, MA (US)

( * ) Notice: Subject to any disclaimer, the term of this patent is extended or adjusted under 35 U.S.C. 154(b) by 248 days.

(21) Appl. No.: 15/184,498

(22) Filed: Jun. 16, 2016

(65) Prior Publication Data

US 2016/0289500 A1     Oct. 6, 2016

Related U.S. Application Data

(62) Division of application No. 12/657,334, filed on Jan. 19, 2010, now Pat. No. 9,382,450.

(60) Provisional application No. 61/205,229, filed on Jan. 20, 2009, provisional application No. 61/277,808, filed on Sep. 30, 2009.

(51) Int. Cl.
| | | |
|---|---|---|
| *C09G 1/02* | (2006.01) | |
| *C09K 3/14* | (2006.01) | |
| *B82Y 30/00* | (2011.01) | |
| *C09C 1/30* | (2006.01) | |

(52) U.S. Cl.
CPC ........... *C09G 1/02* (2013.01); *B82Y 30/00* (2013.01); *C09C 1/3081* (2013.01); *C09K 3/1436* (2013.01); *C09K 3/1463* (2013.01); *C01P 2004/62* (2013.01); *C01P 2004/64* (2013.01)

(58) Field of Classification Search
CPC .. B82Y 30/00; C01P 2004/62; C01P 2004/64; C09C 1/3081; C09G 1/02; C09K 3/1436; C09K 3/1463
See application file for complete search history.

(56) References Cited

U.S. PATENT DOCUMENTS

| 5,430,166 | A | 7/1995 | Klein et al. |
|---|---|---|---|
| 6,372,648 | B1 | 4/2002 | Hall et al. |
| 6,541,383 | B1 | 4/2003 | Allman et al. |
| 6,582,623 | B1 | 6/2003 | Grumbine et al. |
| 6,582,761 | B1 | 6/2003 | Nishimoto et al. |
| 6,656,241 | B1 | 12/2003 | Hellring et al. |
| 6,663,851 | B1 | 12/2003 | Deller et al. |
| 7,166,017 | B2 | 1/2007 | Minamihaba et al. |
| 7,186,768 | B2 | 3/2007 | Korth et al. |
| 7,435,450 | B2 | 10/2008 | Chen et al. |
| 2003/0200900 | A1 | 10/2003 | Korth et al. |
| 2004/0033771 | A1 | 2/2004 | Hirokawa et al. |
| 2004/0186206 | A1 | 9/2004 | Yoneda et al. |
| 2005/0178730 | A1* | 8/2005 | Li .................... B01J 20/288 |
| | | | 210/656 |
| 2006/0083694 | A1 | 4/2006 | Kodas et al. |
| 2008/0216709 | A1 | 9/2008 | Steingrover et al. |
| 2008/0277038 | A1 | 11/2008 | Guichon et al. |
| 2009/0007936 | A1 | 1/2009 | Uhl et al. |
| 2009/0081871 | A1 | 3/2009 | Dysard et al. |
| 2009/0081927 | A1 | 3/2009 | Grumbine et al. |
| 2009/0087988 | A1 | 4/2009 | Saie |
| 2009/0186053 | A1 | 7/2009 | Meyer et al. |
| 2009/0202816 | A1 | 8/2009 | Schlenoff |
| 2010/0075502 | A1 | 3/2010 | Li et al. |

FOREIGN PATENT DOCUMENTS

| GB | 1433303 | 4/1976 |
|---|---|---|
| JP | 2006147993 | 8/2006 |
| WO | WO 01/04226 A2 | 1/2001 |
| WO | WO 0202707 | 1/2002 |
| WO | WO 2005/079975 | 9/2005 |
| WO | WO 2009103651 | 8/2009 |

OTHER PUBLICATIONS

Cejas and Raymo, Fluorescent Diazapyrenium Films and Their Response to Dopamine, Langmuir, 21, pp. 5795-5802, 2005.
Notification of Transmittal of the International Search Report and the Written Opinion of the International Searching Authority, or the Declaration of International Patent Application No. PCT/US2010/000120, dated May 12, 2010.
Notification of Transmittal of International Preliminary Report on Patentability (Chapter I of the Patent Cooperation Treaty) of International Patent Application No. PCT/US2010/000120, dated Aug. 4, 2011.
U.S. Appl. No. 12/657,334, filed Jan. 19, 2010, Issued.

\* cited by examiner

*Primary Examiner* — Shuangyi Abu Ali

(57) ABSTRACT

The present invention relates to a composition comprising a silane modified metal oxide, wherein the silane modified metal oxide comprises a metal oxide having attached at least one silyl group, and wherein the silyl group comprises at least one —$SO_3^-M^+$, —$OSO_3^-M^+$, —$SSO_3^-M^+$, —$NHSO_3^-M^+$, —$NR'SO_3^-M^+$, —$NR'_3^+A^-$, or -$Q^+A^-$ group. R', which can be the same or different, is a branched or unbranched, substituted or unsubstituted alkyl, alkenyl or alkynyl group or a substituted or unsubstituted aryl, heteroaryl, alkylaryl; or arylalkyl group, $M^+$ is a cationic counterion, and $A^-$ is a anionic counterion. The present invention further relates to the silane modified metal oxide used in the disclosed chemical mechanical polishing composition.

22 Claims, No Drawings

COMPOSITIONS COMPRISING SILANE MODIFIED METAL OXIDES

CROSS-REFERENCE TO RELATED APPLICATIONS

This patent application is a divisional application of U.S. Ser. No. 12/657,334, filed Jan. 19, 2010, which claims the benefit of U.S. Provisional Patent Application No. 61/205,229, filed Jan. 20, 2009 and U.S. Provisional Patent Application No. 61/277,808, filed Sep. 30, 2009.

BACKGROUND OF THE INVENTION

1. Field of the Invention

The present invention relates to silane modified metal oxides and compositions, including chemical mechanical polishing (CMP) compositions comprising the same.

2. Description of the Related Art

Great advances are being made in the miniaturization of electronic components used in the computer and electronic industries. The miniaturization of electronic components typically involves depositing, etching and/or polishing multiple metal and oxide layers to build up an electronic substrate. Miniaturization however has created component quality concerns, many of which are overcome by precisely polishing the computer and electronic substrate materials. In order to polish electronic component surfaces precisely it has become necessary to develop chemical mechanical polishing (CMP) slurries that are compatible with the combination of surfaces being polished.

Typically, metal oxide abrasives are used in chemical mechanical polishing slurries, and several methods have been described to modify the surface chemistry of abrasive particles. For example, U.S. Pat. No. 5,645,736 discloses a method for polishing a work piece that uses organopolysiloxane polymers to disperse and hold the abrasive particles in a temporary film or matrix on the substrate being polished. Also, U.S. Pat. No. 5,767,016 discloses a polishing composition including abrasive particles that have been combined with organo metallic compounds such as -aminopropyltriethoxy silane. The particles are subsequently used in a slurry to polish a semiconductor device. In addition, U.S. Pat. No. 6,582,623 discloses CMP compositions comprising a dispersion of silane modified abrasive particles that are the product of the combination of at least one metal oxide abrasive particle including at least one surface metal hydroxide and at least one silane compound that includes at least one non-hydrolyzable substituent. Furthermore, U.S. Pat. No. 7,044,836 describes a method of polishing a substrate using a polishing composition comprising metal oxide particles having a surface with a silane compound adhered to a portion thereof a polymer adhered to the silane compound. The polymer is a water-soluble or water emulsifiable polymer. In addition, International Patent Publication No. 2007/146680 describes a stabilized silica colloid comprising a silica surface and a plurality of zwitterionic functional groups covalently bound to the silica surface, which can be used a CMP composition.

While such approaches produce useful polishing compositions, there remains a need in the industry for chemical mechanical polishing compositions comprising a metal oxide abrasive that are colloidally stable across a broad pH range.

SUMMARY OF THE INVENTION

The present invention relates to a chemical mechanical polishing composition comprising at least one silane modified metal oxide, which comprises a metal oxide having attached at least one silyl group. The silyl group comprises at least one $-SO_3^-M^+$, $-OSO_3^-M^+$, $-SSO_3^-M^+$, $-NHSO_3^-M^+$, $-NR'SO_3^-M^+$, $-NR'^+_3A^-$, or $-Q^+A^-$ group, wherein R', which can be the same or different, is a branched or unbranched, substituted or unsubstituted alkyl, alkenyl or alkynyl group or a substituted or unsubstituted aryl, heteroaryl, alkylaryl; or arylalkyl group, $Q^+$ is a heterocyclic or heteroaromatic quaternary ammonium group, $M^+$ is a cationic counterion, and $A^-$ is a anionic counterion. Preferably, the silyl group has the formula $-Si(X)_n[(R''-HET)_mL-(R-I)]_{3-n}$, wherein X, which can independently be the same or different, is $-OH$, a hydrolyzable substituent, a non-hydrolyzable substituent, or an oxygen-containing substituent having the formula $-O-G-$ wherein G is a Si of a silicon-containing group or a surface metal atom of the metal oxide; R and R'' are independently a branched or unbranched alkylene, alkenylene, or alkynylene group or an arylene, heteroarylene, alkylarylene; or arylalkylene group; HET is a heteroatom group; L is a linking group; m is 0, 1, 2, 3, 4, 5, or 6; n is 0, 1, or 2; and I is the $-SO_3^-M^+$, $-OSO_3^-M^+$, $-SSO_3^-M^+$, $-NHSO_3^-M^+$, $-NR'SO_3^-M^+$, $-NR'^+_3A^-$, or $-Q^+A^-$ group. The silyl group can be a non-zwitterionic group, such as a group in which m is not 0 and, when HET is S or O, I is a $-SO_3^-M^+$, $-OSO_3^-M^+$, $-SSO_3^-M^+$, $-NHSO_3^-M^+$, $-NR'SO_3^+M^+$, $-NR'^+_3A^-$, or $-Q^+A^-$ group, or, when HET is NR', I is a $-NR'^+_3A^-$, or $-Q^+A^-$ group. The present invention further relates to the silane modified metal oxides used in the CMP composition.

It is to be understood that both the foregoing general description and the following detailed description are exemplary and explanatory only and are intended to provide further explanation of the present invention, as claimed.

DETAILED DESCRIPTION OF THE INVENTION

The present invention relates to chemical mechanical polishing compositions and silane modified metal oxides used therein.

The chemical mechanical polishing composition of the present invention comprises at least one silane modified metal oxide as the abrasive component, and this modified abrasive comprises a metal oxide having attached at least one silyl group. The metal oxide can be any inorganic oxide known in the art having surface hydroxide groups that are accessible for reaction with silane modifying agents. For example, the metal oxide can be alumina, titania, zirconia, germania, silica, ceria, tantalum oxide ($TaO_x$), mixtures thereof, and chemical admixtures thereof (i.e., particles including atomically mixed or coated metal oxide mixtures). Preferably, the metal oxide abrasive is silica (silicon dioxide), including fumed silica, colloidal silica, precipitated silica, silica gel, or silica aerogel. More preferably, the metal oxide is fumed or colloidal silica.

The metal oxide may be individual single particles or aggregates of individual particles, depending on how they are prepared. For example, colloidal silicas are generally in the form of single particles while fumed silicas are typically aggregates of primary particles. Thus, the term "particle" as it is used herein refers to both aggregates of more than one primary particle as well as to single particles. The metal oxide may be produced using any techniques known to those skilled in the art, including, for example, flame processes, sol-gel processes, hydrothermal processes, plasma processes, aerogel processes, fuming processes, precipitation processes, mechanochemical milling, mining, and by any combination of these processes.

The silane modified metal oxide comprises the metal oxide having attached at least one silyl group, which is a silicon-containing group that is attached to the metal oxide surface at the silicon atom of the silicon-containing group. The silyl group can be attached to a portion of the surface of the metal oxide through one or more covalent bonds, one or more electrostatic bonds (e.g., one or more ionic bonds), one or more hydrogen bonds, one or more van der waals bonds, or combinations thereof. Preferably, the silyl group is attached to a portion of the surface of the metal oxide particle through one or more covalent bonds.

The silyl group further comprises at least one —$SO_3^-M^+$, —$OSO_3^-M^+$, —$SSO_3^-M^+$, —$NHSO_3^-M^+$, —$NR'SO_3^-M^+$, —$NR'_3^+A^-$, or -$Q^+A^-$ group. R', which can be the same or different, is a branched or unbranched, substituted or unsubstituted alkyl, alkenyl or alkynyl group or a substituted or unsubstituted aryl, heteroaryl, alkylaryl; or arylalkyl group, $Q^+$ is a heterocyclic or heteroaromatic quaternary ammonium group (such as a pyridinium group), $M^+$ is a cationic counterion, and $A^-$ is a anionic counterion. As counterions, $M^+$ and $A^-$ can be removed from the silyl group by ion exchange or other known techniques, discussed further below. Suitable examples of cationic counterions include metal cations (such as $Na^+$, $Li^+$, and $K^+$), $H^+$, an ammonium ion (including $NH_4^+$ as well as protonated primary, secondary, or tertiary alkyl amines and protonated aromatic amines, such as pyridine), a quaternary ammonium ion (including alkylated tertiary amines and aromatic amines), and mixtures thereof. The cation is preferably an ammonium or a quaternary ammonium ion. Suitable examples of anionic counterions include halides ($F^-$, $Cl^-$, $Br^-$, or $I^-$), hydroxide, acetate, nitrate, carboxylate, sulfate, methane sulfonate, methyl sulfate, and mixtures thereof. The anionic counter ion is preferably nitrate, acetate, a carboxylate, methanesulfonate, or methylsulfate. Examples of specific silyl groups include those comprising a —$SO_3^-NHMe_3^+$ group, a —$SO_3^-NH_4^+$ group, a —$SSO_3^-Na^+$ group, a —$SSO_3^- NH_4^+$ group, a —$N(Me)SO_3^-NHMe_3^+$ group, a —$NHSO_3^- NHMe_3^+$ group, a —$NMe_3^+Cl^-$ group, a —$NMe_3^+Br^-$ group, a —$NEt_3^+Cl^-$ group, a —$NC_5H_5^+Cl^-$ group, or a —$NC_5H_5^+NO_3^-$ group.

Preferably, the silyl group of the silane modified metal oxide has the formula —$Si(X)_n[(R''-HET)_mL-(R—I)]_{3-n}$. X, which can independently be the same or different, is —OH, a hydrolyzable substituent, a non-hydrolyzable substituent, or an oxygen-containing substituent having the formula —O-G-, wherein G is a Si of a silicon-containing group or a surface metal atom of the metal oxide. As used herein, the term "hydrolyzable" refers to substituents that will form an Si—OH group in an aqueous system, such as an alkoxy group. The term "non-hydrolyzable" refers to substituents that do not undergo hydrolysis to form an Si—OH group in an aqueous solution. Suitable examples include alkyl groups, cycloalkyl groups, aromatic groups, or alkenyl groups, which can each be further substituted with one or more functional groups. In this formula, R and R'' are independently a branched or unbranched alkylene (such as methylene, ethylene, or propylene), alkenylene, or alkynylene group or an arylene, heteroarylene, alkylarylene, or arylalkylene group. R and R'' may also include additional functional groups, such as hydroxyl or alkoxy groups. HET is a heteroatom group such as S, NR', or O, wherein R' is as described above. L is a linking group which, as used herein, is a bond or a chemical group that links the (R—I) group to the metal oxide. Examples of chemical groups include, but are not limited to, —CO—, —CONR'—, —$SO_3$—, —$SO_2$—, —$SO_2NR'$—, —$CH_2CH_2CO$—, —$CH_2CH_2COO$—, —$CH_2CH_2CONR'$—, —$CH_2CH$ (OH)—, and the like, wherein R' is as described above. In this formula, m is 0, 1, 2, 3, 4, 5, or 6 and is preferably 0, 1, or 2; and n is 0, 1, or 2. When m is not 0, each HET can be the same or different. Thus, for example, the silyl group may have the formula —$Si(X)_n[(R''-HET1)_p(R''-HET2)_q-(R—I)]_{3-n}$ wherein HET1 and HET2 are different heteroatom groups and p+q=m. Similarly, each R'' may also be the same or different when m is not 0. I is the —$SO_3^-M^+$, —$OSO_3^-M^+$, —$SSO_3^-M^+$, —$NHSO_3^-M^+$, —$NR'SO_3^-M^+$, —$NR'_3^+A^-$, or -$Q^+A^-$ group, wherein R', $M^+$, $A^-$, and $Q^+$ are as described above. As specific examples when m is not 0, HET can be S or O and I can be a —$SO_3^-M^+$, —$OSO_3^-M^+$, —$SSO_3^-M^+$, —$NHSO_3^-M^+$, —$NR'SO_3^-M^+$, —$NR'_3^+A^-$, or -$Q^+A^-$ group, or HET can be NR' and I can be a —$NR'_3^+A^-$, or group. Thus, as shown by these examples, the silyl group can be a non-zwitterionic group and, as such, does not comprise a zwitterion (also sometimes referred to as an inner salt) which is a group that contains non-adjacent positively and negatively charged atoms on the same group.

The silane modified metal oxide may be prepared using any method known in the art. For example, the modified abrasive can be the combination product of a metal oxide and a silane compound, which can be considered to be a treating agent for the metal oxide. Suitable classes of silane compounds that can be used include alkoxysilanes, silazanes, halosilanes, and carboxysilanes (such as acetoxysilanes). For example, the silane modified metal oxide may be the combination product of a metal oxide having at least one surface metal hydroxide and at least one silane compound having the formula Y—$Si(X')_n[(R''-HET)_mL-(R—I)]_{3-n}$ and partially hydrolyzed derivatives thereof. In this formula, R, R'', HET, L, I, m, and n are as described above. X', which can independently be the same or different, is —OH, a hydrolyzable substituent, a non-hydrolyzable substituent, or an oxygen-containing substituent having the formula —O-G-, wherein G is a Si of a silicon-containing group or a surface metal atom of the metal oxide and can be the same or different from X. Y is —OH or a hydrolyzable substituent. Suitable examples of hydrolyzable substituents for X' and Y include, but are not limited to, alkoxy groups, halogens (such as a Cl group), carboxylates (such as an acetate group), amines, and amides.

Alternatively, the silane modified metal oxide of the present invention may be prepared as the combination product of a metal oxide having at least one surface metal hydroxide and at least one precursor silane compound having a reactive functional group that is subsequently reacted with a second treating agent to form the silyl group having the formula —$Si(X)_n[(R''-HET)_mL-(R—I)]_{3-n}$. As one example of this two-step method, the silane modified metal oxide may be the combination product of a metal oxide having at least one surface metal hydroxide and at least one precursor silane compound having the formula Y—$Si(X')_n[(R''-HET)_mL-(R—Z)]_{3-n}$ and partially hydrolyzed derivatives thereof, which is subsequently reacted to form the silane modified metal oxide having the attached silyl groups described above. In this formula, R, R'', HET, X', m, n, and Y are as described above, and Z is a group that can be chemically converted to the —$SO_3^-M^+$, —$OSO_3^- M^+$, —$SSO_3^-M^+$, —$NHSO_3^-M^+$, —$NR'SO_3M^+$, —$NR'_3^+ A^-$, or -$Q^+A^-$ group, including a halogen (which, for example, can be converted to a —$SO_3^-M^+$, —$OSO_3^-M^+$, a —$SSO_3^-M^+$, a —$NR'_3^+A^-$, or a -$Q^+A^-$ group), a thiol group (which, for example, can be converted to a —$SO_3^-M^+$ using any suitable oxidant), or an amino group (which, for example, can be converted to a —NR'$_3^+$A$^-$ group by alkylation or to a —NR'SO$_3^-$M$^+$ or —NR'SO$_3^-$M$^+$ group by sulfonation). As specific examples, when n is 2 and both X' are hydroxy or a hydrolyzable substituents, suitable silane compounds include mercaptopropyltrialkoxysilanes, chloropropyltrialkoxysilanes, aminopropyltrialkoxysilanes, and N-alkylaza-silacyclopentanes (such as N-methylaza-2,2,4-trimethyl-2-silacyclopentane). Other suitable silane compounds will be known to one skilled in the art.

As a second example of this two-step method, the silane modified metal oxide may be the combination product of a metal oxide having at least one surface metal hydroxide and at least one precursor silane compound having the formula Y—Si(X')$_n$[(R"-HET)$_m$H]$_{3-n}$ and partially hydrolyzed derivatives thereof, which is subsequently reacted with a compound having the formula Z'—(R–I) to form the silane modified metal oxide having the attached silyl groups described above. In these formulas, R, R", HET, X', m, n, Y, and I are as described above, and, for this specific example, m is not 0. Since m is not 0 for this example, the combination product of the metal oxide and the precursor silane compound has an attached group with a terminal HET-H nucleophilic group, such as an alcohol, a thiol, or amine group (or salts thereof). Z' is an electrophilic chemical group that reacts with the nucleophilic HET-H group to form the linking group, L. As specific examples, Z' may be an epoxide group (which would react with the nucleophilic HET-H group to form a —CH$_2$CH(OH)— linking group), an alpha, beta-unsaturated carbonyl group, such as an acrylamide group (which would react with the nucleophilic HET-H group to form a —CH$_2$CH$_2$CO—, —CH$_2$CH$_2$COO—, or —CH$_2$CH$_2$CONR'— linking group), or a carboxylic acid derivative (which would react with the nucleophilic HET-H group to form a —CO— or —CONR'— linking group).

As a third example of this two-step method, the silane modified metal oxide may be the combination product of a metal oxide having at least one surface metal hydroxide and at least one precursor silane compound having the formula Y—Si(X')$_n$(R"—Z")$_{3-n}$ and partially hydrolyzed derivatives thereof, which is subsequently reacted with a compound having the formula H-(HET-L-R—I) to form the silane modified metal oxide having the attached silyl groups described above. In these formulas, R, R", HET, X', L, n, Y, and I are as described above. Z" is an electophilic group, such as a halogen, an epoxide, an alpha, beta-unsaturated carbonyl group, or a carboxylic acid deriviative, which reacts with the nucleophilic H-HET, such as an alcohol, a thiol, or an amine group (or salts thereof). Other specific combinations are also possible and would be known to one of ordinary skill in the art.

The combination products may be prepared by any methods known for associating a silane compound and a metal oxide having surface metal hydroxides. For example, the silane compound may be dissolved in a solvent such as water or a water/alcohol mixture and sprayed onto the surfaces of metal oxide, which is thereafter dried to produce the silane modified metal oxide. Alternatively, the silane modified metal oxide can be prepared by combining a metal oxide having surface metal hydroxides with a solvent such as water or a water/alcohol mixture (for example, a mixture of water and methanol) and mechanically dispersing the metal oxide in the solvent. Once dispersed, the silane compound, either neat or as a solution, may be added to the dispersion to produce the silane modified metal oxide as a dispersion, which can either be separated from the treating solution and dried or used directly in the manufacture of a chemical mechanical polishing slurry. In addition, a precursor silane compound can be used in place of the silane compound in either of these exemplary methods, and, the reaction to form the silane modified metal oxide can occur at any stage after these components are combined, thereby forming the silane modified metal oxide that can be used to prepare the chemical mechanical polishing composition. Also, the counterion of the attached silyl group can be changed using any method known in the art, including, for example, neutralization, diafiltration, or using various types of ion exchange resins.

The silane modified metal oxide has an amount of attached silyl groups that is sufficient to achieve the desired dispersion stability and polishing results. For example, the total amount of silyl group may be from about 0.1 to about 6.0 micromoles of groups/m$^2$ surface area of modified metal oxide, including from about 0.5 to about 3.0 micromoles/m$^2$. However, more than a mono-layer coverage is acceptable.

The silane modified metal oxide can be incorporated into the chemical mechanical polishing composition using any method known in the art, depending on the form of the abrasive particle. For example, the silane modified metal oxide can be in a solid form, such as a powder or a paste, and incorporated into the chemical mechanical polishing composition using various known dispersion techniques, such as by slowly adding the silane modified metal oxide to an appropriate vehicle, for example, deionized water, to form a colloidal dispersion and subjecting this dispersion to high shear mixing conditions known to those skilled in the art. Alternatively, the silane modified metal oxide can be in the form of a dispersion or slurry in a liquid vehicle, and diluted, concentrated, or further formulated into the chemical mechanical polishing composition. When in the form of a dispersion, the liquid vehicle is preferably an aqueous vehicle, which is a vehicle that contains greater than 50% by weight water and can be, for example, water or mixtures of water with water miscible solvents such as alcohols. Preferably, the silane modified metal oxide is incorporated into the chemical mechanical polishing composition as a concentrated aqueous dispersion that ranges from about 3% to about 45% by weight solids, and preferably between 10% and 20% by weight solids.

The chemical mechanical polishing composition of the present invention comprises the silane modified metal oxide in an amount sufficient to achieve the desired polishing results and can vary depending, for example, on the type of surface to be polished. In general, the silane modified metal oxide is present in an amount of less than or equal to about 15 wt % based on the total weight of the composition. For polishing metal layers, it is preferred that the silane modified metal oxide is present in an amount of from about 0.1 to 7 wt %, and, for polishing an oxide layer, it is preferred that the silane modified metal oxide be present in an amount of from about 5 to about 15 wt % silane modified abrasive particle.

The chemical mechanical polishing compositions of the present invention may further comprise one or more optional chemical mechanical polishing slurry additives including, for example, acids, complexing agents, oxidizing agents, catalysts, stabilizers, dispersants, surfactants, corrosion inhibitors, buffers, compounds for adjusting solution pH and so forth. Any components that are known in the art to be useful in chemical mechanical polishing slurries and compositions may be used along with the silane modified metal oxides described above.

For example, the chemical mechanical polishing composition can further comprise an acid, including, for example, an inorganic acid (such as nitric acid, phosphoric acid, sulfuric acid, salts thereof, and combinations thereof) or an organic acid (such as oxalic acid, malonic acid, tartaric acid, acetic acid, lactic acid, propionic acid, phthalic acid, benzoic acid, citric acid, succinic acid, salts thereof, and combinations thereof). Also, the chemical mechanical polishing composition can further comprise a surfactant. Suitable surfactants include, but are not limited to, cationic surfactants, anionic surfactants, nonionic surfactants, amphoteric surfactants, fluorinated surfactants, and mixtures thereof.

In addition, the chemical mechanical polishing composition can further comprise an oxidizing agent. Suitable oxidizing agents include inorganic and organic per-compounds, bromates, nitrates, chlorates, chromates, iodates, iron and copper salts (e.g., nitrates, sulfates, EDTA, and citrates), rare earth and transition metal oxides (e.g., osmium tetraoxide), potassium ferricyanide, potassium dichromate, iodic acid, and the like. A per-compound (as defined by Hawley's Condensed Chemical Dictionary) is a compound containing at least one peroxy group (—O—O—) or a compound containing an element in its highest oxidation state. Examples of compounds containing at least one peroxy group include but are not limited to hydrogen peroxide and its adducts such as urea hydrogen peroxide and percarbonates, organic peroxides such as benzoyl peroxide, peracetic acid, and di-tert-butyl peroxide, monopersulfates ($SO_5^{-4}$), dipersulfates ($S_2O_8^{-2}$), and sodium peroxide. Examples of compounds containing an element in its highest oxidation state include but are not limited to periodic acid, periodate salts, perbromic acid, perbromate salts, perchloric acid, perchlorate salts, perboric acid, perborate salts, and permanganates.

Furthermore, the chemical mechanical polishing composition can further comprise a chelating or complexing agent, which is an additive that enhances the removal rate of the substrate layer being removed. Suitable chelating or complexing agents can include, for example, carbonyl compounds (e.g., acetylacetonates, and the like), simple carboxylates (e.g., acetates, aryl carboxylates, and the like), carboxylates containing one or more hydroxyl groups (e.g., glycolates, lactates, gluconates, gallic acid and salts thereof, and the like), di-, tri-, and poly-carboxylates (e.g., oxalates, phthalates, citrates, succinates, tartrates, malates, edetates (e.g., dipotassium EDTA), polyacrylates, mixtures thereof, and the like), carboxylates containing one or more sulfonic and/or phosphonic groups, and the like. Suitable chelating or complexing agents also can include, for example, di-, tri-, or polyalcohols (e.g., ethylene glycol, pyrocatechol, pyrogallol, tannic acid, and the like) and amine-containing compounds (e.g., ammonia, amino acids, amino alcohols, di-, tri-, and polyamines, and the like).

Preferably, the pH of the chemical mechanical polishing composition is from 2 to 11, more preferably from 2 to 8 or from 3 to 10. Surprisingly, it has been found that chemical mechanical polishing compositions comprising the silane modified metal oxides described above, are stable across a broad pH range. Thus, the silane modified metal oxides are well dispersed in the chemical mechanical polishing composition (having a particle size that, for fumed metal oxides, is preferably less than about 300 nm, including less than about 200 nm and less than about 150 nm, and, for colloidal metal oxides, is preferably less than about 300 nm, including less than about 200 nm, less than about 150 nm, less than about 100 nm, less than about 50 nm, and less than about 25 nm) and remain dispersed and are not prone to agglomeration and settling as the pH changes. Therefore, the chemical mechanical polishing compositions of the present invention would have an improved shelf life stability in comparison to unmodified abrasive particle dispersions. In addition, since these CMP compositions are stable to pH changes, such as can occur during polishing operations, they would also be expected to provide improved polishing properties of target surfaces. Also, these compositions provide improved formulation flexibility, enabling the polisher to tailor the composition to the specific surface or desired polishing rate.

The chemical mechanical polishing composition of the present invention can be used to polish any suitable substrate comprising at least one metal layer. Suitable substrates include, but are not limited to, integrated circuits, memory or rigid disks, metals, interlayer dielectric (ILD) devices, semiconductors, micro-electro-mechanical systems, ferroelectrics, and magnetic heads. The metal layer can comprise any suitable metal. For example, the metal layer can comprise copper, tantalum, titanium, aluminum, nickel, platinum, ruthenium, iridium, or rhodium. The substrate can further comprise at least one insulating layer. The insulating layer can be a metal oxide, porous metal oxide, glass, organic polymer, fluorinated organic polymer, or any other suitable high or low-K insulating layer.

The substrate layers may be polished using any method known in the art. For example, the chemical mechanical polishing compositions of the present invention can be used to polish substrate features by conventional means using an apparatus comprising a platen, which, when in use, is in motion and has a velocity that results from orbital, linear, or circular motion, a polishing pad in contact with the platen and moving with the platen when in motion, and a carrier that holds a substrate to be polished by contacting and moving relative to the surface of the polishing pad. The polishing of the substrate takes place by the substrate being placed in contact with the polishing pad and the polishing composition of the invention and then the polishing pad moving relative to the substrate, so as to abrade at least a portion of the substrate to polish the substrate. The chemical mechanical polishing compositions of the present invention may be applied directly to the substrate, they may be applied to the polishing pad, or they may be applied to both in a controlled manner during substrate polishing. It is preferred however that these polishing compositions are applied to the polishing pad which thereafter is brought into contact with the substrate surface after which the pad is moved in relationship to the substrate surface in order to achieve substrate polishing. The polishing compositions of the present invention are then continuously or intermittently applied to the polishing pad in order to maintain a sufficient amount of polishing composition at the pad/substrate surface. When the polishing end point is reached, the flow of polishing composition to the polishing pad is interrupted and excess polishing composition is washed from the substrate with deionized water or another solvent.

The present invention will be further clarified by the following examples, which are intended to be only exemplary in nature.

EXAMPLES

Examples 1-15

The following examples describe the preparation of silane modified metal oxide for use in chemical mechanical polishing compositions of the present invention. For these examples, the zeta potential of the samples was measured using either a Zeta Plus from Brookhaven Instruments, Holtsville, N.Y. or a ZetaProbe from Colloidal Dynamics, Warwick, R.I. The mean volume particle size (mv) was determined by dynamic light scattering using a Microtrac™ Ultrafine Particle Analyzer in deionized water.

Example 1

Mercaptopropyl trimethoxy silane (7.07 g,) was added to a stirring mixture of 177.8 g (45% solids) Ludox CL-X colloidal silica dispersion (available from Sigma-Aldrich), 64 g of water, and 160 g of methanol. The mixture was then heated at 50° C. for 90 hr. The mixture was cooled to room temperature, and a 200 g portion was removed. Hydrogen peroxide (6.05 g of a 30% solution) was added to the portion, and the mixture was heated for 50 hr at 65° C. Additional hydrogen peroxide (6.12 g of a 30% solution) was added and heating was continued for 15 hr, forming an aqueous dispersion of a silane modified metal oxide having an attached sulfonate group. The pH of the dispersion was 1.7.

Samples of the aqueous silane modified metal oxide dispersions were adjusted to pH values of 3, 6 and 10 with ammonium hydroxide and nitric acid as needed. The counterion could also be changed, for example, to tetramethyl ammonium by passing the sample through an appropriate ion exchange column or using other known methods. The zeta potential and mean volume particle size (mv) of each pH adjusted sample was measured, and the results are shown in Table 1 below.

TABLE 1

|  | pH = 3 | pH = 6 | pH = 10 |
| --- | --- | --- | --- |
| zeta potential (mV) | −51 | −46 | −44 |
| particle size (nm) | 29 | 30 | 29 |

As the results show, the silane modified metal oxide having an attached sulfonate group formed good aqueous dispersions at a pH of from 3 to 10. The large negative zeta potential indicates that the attached sulfonate group is negatively charged at these pH values.

In addition, samples were aged at pH 3 and 6 at 45° C. for 97 days, and the zeta potentials and particle sizes were measured. The results are shown in Table 2 below.

TABLE 2

|  | pH = 3 aged | pH = 6 aged |
| --- | --- | --- |
| zeta potential (mV) | −31 | −32 |
| particle size (nm) | 29 | 29 |

These results show that, even after aging, the silane modified metal oxide having an attached sulfonate group remained well dispersed at these pH values. Thus, it would be expected that this silane modified metal oxide could be used as an abrasive in a chemical mechanical polishing composition.

By comparison, samples were prepared by adjusting a dispersion of 20% (solids basis) untreated Ludox CLX silica, 40% water and 40% methanol to pH values of 3 and 6 with nitric acid and ammonium hydroxide. The comparative sample aged at 45° C. for 97 days at pH 6 gelled, while the comparative sample aged at pH 3 grew to a size of over 250 nm.

Example 2

Mercaptopropyl trimethoxy silane (7.07 g,) was added to a stirring mixture of 177.8 g (45% solids) Ludox CL-X colloidal silica dispersion (available from Sigma-Aldrich), 64 g of water and 160 g of methanol. The mixture was then heated at 50° C. for 90 hr. The mixture was cooled to room temperature, and a 163 g portion was removed. Hydrogen peroxide (24.5 g of a 30% solution) was added to the portion, and the mixture was heated for 51 hr at 65° C. The resulting aqueous dispersion of a silane modified metal oxide having an attached sulfonate group had a pH of 1.1.

Samples of the aqueous silane modified metal oxide dispersions were adjusted to pH values of 3, 6 and 10 with ammonium hydroxide and nitric acid as needed. The counterion could also be changed, for example, to tetramethyl ammonium by passing the sample through an appropriate ion exchange column or using other known methods. The zeta potential and mean volume particle size (mv) of each pH adjusted sample was measured, and the results are shown in Table 3 below.

TABLE 3

|  | pH = 3 | pH = 6 | pH = 10 |
| --- | --- | --- | --- |
| zeta potential (mV) | −53 | −46 | −45 |
| particle size (nm) | 28 | 29 | 29 |

As the results show, the silane modified metal oxide having an attached sulfonate group formed good aqueous dispersions at a pH of from 3 to 10. The large negative zeta potential indicates that the attached sulfonate group is negatively charged at these pH values.

In addition, each of the pH adjusted samples were aged at 45° C. for 39 days, and the zeta potentials and particle sizes were measured. The results are shown in Table 4 below.

TABLE 4

|  | pH = 3 aged | pH = 6 aged | pH = 10 aged |
| --- | --- | --- | --- |
| zeta potential (mV) | −50 | −38 | −50 |
| particle size (nm) | 28 | 30 | 30 |

These results show that, even after aging, the silane modified metal oxide having an attached sulfonate group remained well dispersed at these pH values. Thus, it would be expected that this silane modified metal oxide could be used as an abrasive in a chemical mechanical polishing composition.

By comparison, samples were prepared by adjusting a dispersion of 20% (solids basis) untreated Ludox CLX silica, 40% water and 40% methanol to pH values of 3 and 6 with nitric acid and ammonium hydroxide. The comparative sample aged at 45° C. for 97 days at pH 6 gelled, while the comparative sample aged at pH 3 grew to a size of over 175 nm.

Example 3

Mercaptopropyl trimethoxy silane (10.67 g,) was added to a stirring mixture of 266.8 g (45% solids) Ludox CL-X colloidal silica dispersion (available from Sigma-Aldrich) and 233.8 g of water. The mixture was then heated at 50° C. for 2 hr. The mixture was cooled to room temperature, and a 402 g portion was removed. Hydrogen peroxide (28.9 g of a 30% solution) was added to the portion, and the mixture was shaken at room temperature for 30 min, then heated for 17 hr at 50° C., and finally heated at 85° C. for an additional 5.5 hr. The resulting aqueous dispersion of a silane modified metal oxide having an attached sulfonate group had a pH of 1.3.

Samples of the aqueous silane modified metal oxide dispersions were adjusted to pH values of 3, 6 and 10 with ammonium hydroxide and nitric acid as needed. The counterion could also be changed, for example, to tetramethyl ammonium by passing the sample through an appropriate ion exchange column or using other known methods. The zeta potential and mean volume particle size (mv) of each pH adjusted sample was measured, and the results are shown in Table 5 below.

TABLE 5

|  | pH = 3 | pH = 6 | pH = 10 |
|---|---|---|---|
| zeta potential (mV) | −34 | −27 | −24 |
| particle size (nm) | 24 | 25 | 25 |

As the results show, the silane modified metal oxide having an attached sulfonate group formed good aqueous dispersions at a pH of from 3 to 10. The large negative zeta potential indicates that the attached sulfonate group is negatively charged at these pH values.

In addition, each of the pH adjusted samples were aged at 45° C. for 67 days, and the zeta potentials and particle sizes were measured. The results are shown in Table 6 below.

TABLE 6

|  | pH = 3 aged | pH = 6 aged | pH = 10 aged |
|---|---|---|---|
| zeta potential (mV) | −35 | −43 | −38 |
| particle size (nm) | 25 | 24 | 26 |

These results show that, even after aging, the silane modified metal oxide having an attached sulfonate group remained well dispersed at these pH values. Thus, it would be expected that this silane modified metal oxide could be used as an abrasive in a chemical mechanical polishing composition.

By comparison, samples were prepared by adjusting a dispersion of 20% (solids basis) untreated Ludox CLX silica and 80% water to pH values of 3 and 6 with nitric acid and ammonium hydroxide. Each of these comparative samples, aged at 45° C. for 67 days, gelled.

Example 4

Water (472 g) and 34 g Cab-O-Sil M5 fumed silica (available from Cabot Corp, Boston, Mass.) were mixed in a 1 L Waring blender for 15 min. An additional 103 g of Cab-O-Sil M5 fumed silica was added, and mixing was continued for an additional 15 min. A 1M aqueous sodium hydroxide solution (56.5 g) was added in portions to the resulting slurry and mixed for an additional 30 min. The pH was reduced to 10.0 with the addition of 4.74 g concentrated nitric acid, and mixing was continued for an additional 25 min, forming a fumed silica dispersion.

Mercaptopropyl trimethoxy silane (5.46 g) was added to a 196 g portion of the fumed silica dispersion, and the resulting mixture was heated to 65° C. and cooled. A 123 g portion was removed, and hydrogen peroxide (11.9 g of a 30% solution) was then added. This mixture was then heated for 44 hr at 50° C., for 44 hr at 78° C., and for 2 hr at 85° C. The resulting aqueous dispersion of a silane modified metal oxide having an attached sulfonate group had a pH of 1.2.

Samples of the aqueous silane modified metal oxide dispersions were adjusted to pH values of 3, 6 and 10 with ammonium hydroxide and nitric acid as needed. The counterion could also be changed, for example, to tetramethyl ammonium by passing the sample through an appropriate ion exchange column or using other known methods. The zeta potential and mean volume particle size (mv) of each pH adjusted sample was measured, and the results are shown in Table 7 below.

TABLE 7

|  | pH = 3 | pH = 6 | pH = 10 |
|---|---|---|---|
| zeta potential (mV) | −44 | −56 | −39 |
| particle size (nm) | 157 | 154 | 158 |

As the results show, the silane modified metal oxide having an attached sulfonate group formed good aqueous dispersions at a pH of from 3 to 10. The large negative zeta potential indicates that the attached sulfonate group is negatively charged at these pH values.

In addition, each of the pH adjusted samples were aged at 45° C. for 44 days, and the zeta potentials and particle sizes were measured. The results are shown in Table 8 below.

TABLE 8

|  | pH = 3 aged | pH = 6 aged | pH = 10 aged |
|---|---|---|---|
| zeta potential (mV) | −49 | −46 | −50 |
| particle size (nm) | 150 | 158 | 164 |

These results show that, even after aging, the silane modified metal oxide having an attached sulfonate group remained well dispersed at these pH values. Thus, it would be expected that this silane modified metal oxide could be used as an abrasive in a chemical mechanical polishing composition.

By comparison, samples were prepared by adjusting a dispersion of 20% (solids basis) untreated Cab-O-Sil M5 silica and 80% water to pH values of 3 and 6 with nitric acid and ammonium hydroxide. Each of these comparative samples, aged at 45° C. for 44 days, gelled.

Example 5

Chloropropyl trimethoxy silane (16.0 g,) was added to a stirring mixture of 400 g (45% solids) Ludox CL-X colloidal silica dispersion (available from Sigma-Aldrich) and 424 g of methanol. The mixture was then heated at 65° C. overnight. $Na_2S_2O_3$ (12.8 g) was added, and the mixture was heated at 65° C. for two days. The resulting aqueous dispersion of a silane modified metal oxide having an attached sodium thiosulfate group had a pH of 9.3.

Samples of the aqueous silane modified metal oxide dispersions were adjusted to pH values of 3, 6 and 10 with ammonium hydroxide and nitric acid as needed. The counterion could also be changed, for example, to tetramethyl ammonium by passing the sample through an appropriate ion exchange column or using other known methods. The zeta potential and mean volume particle size (mv) of each pH adjusted sample was measured, and the results are shown in Table 9 below

TABLE 9

|  | pH = 3 | pH = 6 | pH = 10 |
| --- | --- | --- | --- |
| zeta potential (mV) | −51 | −48 | −57 |
| particle size (nm) | 33 | 32 | 31 |

As the results show, the silane modified metal oxide having an attached thiosulfate group formed good aqueous dispersions at a pH of from 3 to 10. The large negative zeta potential indicates that the attached thiosulfate group is negatively charged at these pH values.

In addition, each of the pH adjusted samples were aged at 45° C. for 14 days, and the zeta potentials and particle sizes were measured. The results are shown in Table 10 below.

TABLE 10

|  | pH = 3 aged | pH = 6 aged | pH = 10 aged |
| --- | --- | --- | --- |
| zeta potential (mV) | −86 | −70 | −74 |
| particle size (nm) | 35 | 32 | 33 |

These results show that, even after aging, the silane modified metal oxide having an attached thiosulfate group remained well dispersed at these pH values. Thus, it would be expected that this silane modified metal oxide could be used as an abrasive in a chemical mechanical polishing composition.

By comparison, samples were prepared by adjusting a dispersion of 20% (solids basis) untreated Ludox CLX silica, 40% water, and 40% methanol to pH values of 3 and 6 with nitric acid and ammonium hydroxide. The comparative sample aged at 45° C. for 14 days at pH 6 gelled, while the comparative sample aged at pH 3 grew to a size of over 75 nm.

Example 6

N-methyl-aza-2,2,4-trimethyl-2-silacyclopentane (5.91 g,) was added to a stirring mixture of 200.4 g (45% solids) Ludox CL-X colloidal silica dispersion (available from Sigma-Aldrich), 63 g of water, and 177 g of methanol. The mixture was then heated at 50° C. for 15.5 hr, and the mixture was cooled to room temperature. A 128 g portion was removed, and to this was added sulfur trioxide trimethylamine complex (25.78 g). The resulting mixture was stirred overnight at room temperature. The resulting aqueous dispersion of a silane modified metal oxide having an attached sulfamate group had a pH of 7.9.

Samples of the aqueous silane modified metal oxide dispersions were adjusted to pH values of 3, 6 and 10 with ammonium hydroxide and nitric acid as needed. The counterion could also be changed, for example, to tetramethyl ammonium by passing the sample through an appropriate ion exchange column or using other known methods. The zeta potential and mean volume particle size (mv) of each pH adjusted sample was measured, and the results are shown in Table 11 below

TABLE 11

|  | pH = 3 | pH = 6 | pH = 10 |
| --- | --- | --- | --- |
| zeta potential (mV) | −50 | −48 | −57 |
| particle size (nm) | 38 | 37 | 33 |

As the results show, the silane modified metal oxide having an attached sulfamate group formed good aqueous dispersions at a pH of from 3 to 10. Thus, it would be expected that this silane modified metal oxide could be used as an abrasive in a chemical mechanical polishing composition. The large negative zeta potential indicates that the attached sulfamate group is negatively charged at these pH values. Also, a sample of this silane modified metal oxide dispersion was purified by centrifugation using several methanol and methanol/water washes. Elemental analysis showed that this material had 0.10 mmol/g of attached sulfur on a solids basis.

Example 7

A 50% solution of N-trimethoxysilylpropyl-N,N,N-trimethylammonium chloride in methanol (12.4 g) was added to a stirring mixture of 89 g (45% solids) Ludox CL-X colloidal silica dispersion (available from Sigma-Aldrich), 28.4 g of water, and 71 g of methanol. The mixture was heated at 68° C. for 24 hr. The resulting aqueous dispersion of a silane modified metal oxide having an attached quaternary ammonium chloride group had a pH of 8.4.

Samples of the aqueous silane modified metal oxide dispersions were adjusted to pH values of 3, 6 and 10 with ammonium hydroxide and nitric acid as needed. The counterion could also be changed, for example, to acetate by passing the sample through an appropriate ion exchange column or using other known methods. The zeta potential and mean volume particle size (mv) of each pH adjusted sample was measured, and the results are shown in Table 12 below

TABLE 12

|  | pH = 3 | pH = 6 | pH = 10 |
| --- | --- | --- | --- |
| zeta potential (mV) | 35 | 39 | 17 |
| particle size (nm) | 127 | 132 | 129 |

As the results show, the silane modified metal oxide having an attached quaternary ammonium group formed good aqueous dispersions at a pH of from 3 to 10. Thus, it would be expected that this silane modified metal oxide could be used as an abrasive in a chemical mechanical polishing composition. The large positive zeta potential indicates that the attached quaternary ammonium group is positively charged at these pH values.

Example 8

(3-Chloropropyl)trimethoxysilane (23.9 g) was added to a stirring mixture of 444.5 g (45% solids) Ludox CL-X colloidal silica dispersion (available from Sigma-Aldrich), 145 g of water and 388 g of methanol. The mixture was then heated at 65° C. for 18 hr. The mixture was cooled to room temperature, and a 103 g portion was removed. 3,4 Lutidine (2.69 g) was added, and the mixture was heated for 151 hr at 65° C. The resulting aqueous dispersion of a silane modified metal oxide having an attached quaternary ammonium group had a pH of 7.0.

The pH of the aqueous silane modified metal oxide dispersion was adjusted to 10 with ammonium hydroxide, and the zeta potential and mean volume particle size (mv) were measured. The zeta potential was found to be 30 mV, and the mean volume particle size (mv) was found to be 54 nm. The counterion could also be changed, for example, to acetate by passing the sample through an appropriate ion exchange column or using other known methods. As these results show, the silane modified metal oxide having an attached quaternary ammonium group formed a good aqueous dispersion at a pH of 10, and the large positive zeta potential indicates that this silane modified metal oxide is positively charged at this pH value. Thus, it would be expected that this silane modified metal oxide could be used as an abrasive in a chemical mechanical polishing composition.

Example 9

(3-Bromopropyl)trimethoxysilane (4.39 g) was added to a stirring mixture of 66.8 g (45% solids) Ludox CL-X colloidal silica dispersion (available from Sigma-Aldrich), 23.2 g of water and 60.0 g of methanol. The mixture was then heated at 65° C. for 5 hr. A 25% aqueous solution (4.39 g) of trimethylamine was added, and the mixture was heated overnight twice at 65° C. while being stirred at room temperature during the day. The resulting aqueous dispersion of a silane modified metal oxide having an attached quaternary ammonium group had a pH of 9.5.

The pH of the aqueous silane modified metal oxide dispersion was adjusted to 10 with ammonium hydroxide, and the zeta potential and mean volume particle size (mv) were measured. The zeta potential was found to be 20 mV, and the mean volume particle size (mv) was found to be 40 nm. The counterion could also be changed, for example, to acetate by passing the sample through an appropriate ion exchange column or using other known methods. As these results show, the silane modified metal oxide having an attached quaternary ammonium group formed a good aqueous dispersion at a pH of 10, and the large positive zeta potential indicates that this silane modified metal oxide is positively charged at this pH value. Thus, it would be expected that this silane modified metal oxide could be used as an abrasive in a chemical mechanical polishing composition.

Example 10

(3-Mercaptopropyl)trimethoxysilane (15.98 g) was added to a stirring mixture of 400.0 g (45% solids) Ludox CL-X colloidal silica dispersion (available from Sigma-Aldrich) and 484.8 g of water. The mixture was then heated at 65° C. for 23 hr. The mixture was cooled to room temperature, and a 121 g portion was removed. A 75% solution (3.06 g) of (3-acrylamidopropyl)trimethylammonium chloride in water was added to the portion, and the mixture was heated for 43 hr at 65° C. The resulting aqueous dispersion of a silane modified metal oxide having an attached quaternary ammonium group had a pH of 8.5.

Samples of the aqueous silane modified metal oxide dispersions were adjusted to pH values of 3, 6 and 10 with ammonium hydroxide and nitric acid as needed. The counterion could also be changed, for example, to acetate by passing the sample through an appropriate ion exchange column or using other known methods. The zeta potential and mean volume particle size (mv) of each pH adjusted sample was measured, and the results are shown in Table 13 below.

TABLE 13

|  | pH = 3 | pH = 6 | pH = 10 |
|---|---|---|---|
| zeta potential (mV) | 38 | 38 | 23 |
| particle size (nm) | 64 | 61 | 69 |

As the results show, the silane modified metal oxide having an attached quaternary ammonium group formed good aqueous dispersions at a pH of from 3 to 10. The large positive zeta potential indicates that the silane modified metal oxide having an attached quaternary ammonium group is positively charged at these pH values.

In addition, the sample of the aqueous silane modified metal oxide dispersion was aged at pH 8.5 for 175 days at room temperature and then adjusted to pH values of 3, 6 and 10 with ammonium hydroxide and nitric acid as needed. The zeta potentials and particle sizes were measured, and the results are shown in Table 14 below.

TABLE 14

|  | pH = 3 aged | pH = 6 aged | pH = 10 aged |
|---|---|---|---|
| zeta potential (mV) | 50 | 47 | 34 |
| particle size (nm) | 64 | 69 | 67 |

These results show that, even after aging, the silane modified metal oxide having an attached quaternary ammonium group remained well dispersed when adjusted to these pH values. Thus, it would be expected that this silane modified metal oxide could be used as an abrasive in a chemical mechanical polishing composition.

Example 11

(3-Mercaptopropyl)trimethoxysilane (18.86 g) was added to a stirring mixture of 356.6 g (45% solids) Ludox CL-X colloidal silica dispersion (available from Sigma-Aldrich), 115.8 g of water and 311.1 g of methanol. The mixture was then heated at 65° C. for 12 hr. The mixture was cooled to room temperature, and a 160 g portion was removed. A 75% solution (5.36 g) of (3-acrylamidopropyl)trimethylammonium chloride in water was added to the portion, and the mixture was heated for 23 hr at 65° C. The resulting aqueous dispersion of a silane modified metal oxide having an attached quaternary ammonium group had a pH of 8.2.

The pH of the aqueous silane modified metal oxide dispersion was adjusted to 10 with ammonium hydroxide, and the zeta potential and mean volume particle size (mv) were measured. The zeta potential was found to be 22 mV, and the mean volume particle size (mv) was found to be 43 nm. The counterion could also be changed, for example, to acetate by passing the sample through an appropriate ion exchange column or using other known methods. As these results show, the silane modified metal oxide having an attached quaternary ammonium group formed a good aqueous dispersion at a pH of 10, and the large positive zeta potential indicates that this silane modified metal oxide is positively charged at this pH value.

In addition, the sample of the aqueous silane modified metal oxide dispersion was aged at pH 8.2 for 115 days at room temperature and then adjusted to pH values of 3, 6 and 10 with ammonium hydroxide and nitric acid as needed. The zeta potentials and particle sizes were measured, and the results are shown in Table 15 below.

TABLE 15

|  | pH = 3 aged | pH = 6 aged | pH = 10 aged |
|---|---|---|---|
| zeta potential (mV) | 41 | 40 | 27 |
| particle size (nm) | 42 | 41 | 41 |

These results show that, even after aging, the silane modified metal oxide having an attached quaternary ammonium group remained well dispersed when adjusted to these pH values. Thus, it would be expected that this silane modified metal oxide could be used as an abrasive in a chemical mechanical polishing composition.

Example 12

(3-Mercaptopropyl)trimethoxysilane (15.98 g) was added to a stirring mixture of 400.0 g (45% solids) Ludox CL-X colloidal silica dispersion (available from Sigma-Aldrich) and 484.8 g of water. The mixture was then heated at 65° C. for 23 hr. The mixture was cooled to room temperature, and a 133 g portion was removed. A 90% solution of glycidyltrimethylammonium chloride (2.03 g) in water was added to the portion, and the mixture was heated for 43 hr at 65° C. The resulting aqueous dispersion of a silane modified metal oxide having an attached quaternary ammonium group had a pH of 8.0.

Samples of the aqueous silane modified metal oxide dispersions were adjusted to pH values of 3, 6 and 10 with ammonium hydroxide and nitric acid as needed. The counterion could also be changed, for example, to acetate by passing the sample through an appropriate ion exchange column or using other known methods. The zeta potential and mean volume particle size (mv) of each pH adjusted sample was measured, and the results are shown in Table 16 below.

TABLE 16

|  | pH = 3 | pH = 6 | pH = 10 |
|---|---|---|---|
| zeta potential (mV) | 33 | 35 | 10 |
| particle size (nm) | 99 | 114 | 107 |

As the results show, the silane modified metal oxide having an attached quaternary ammonium group formed good aqueous dispersions at a pH of from 3 to 10, and the large positive zeta potentials indicate that the attached quaternary ammonium group is positively charged at these pH values. Thus, it would be expected that this silane modified metal oxide could be used as an abrasive in a chemical mechanical polishing composition.

Example 13

(3-Mercaptopropyl)trimethoxysilane (18.86 g) was added to a stirring mixture of 356.6 g (45% solids) Ludox CL-X colloidal silica dispersion (available from Sigma-Aldrich), 115.8 g of water and 311.1 g of methanol. The mixture was then heated at 65° C. for 12 hr. The mixture was cooled to room temperature, and a 114.4 g portion was removed. A 90% solution of glycidyltrimethylammonium chloride in water (2.44 g) was added to the portion, and the mixture was heated for 23 hr at 65° C. The resulting aqueous dispersion of a silane modified metal oxide having an attached quaternary ammonium group had a pH of 8.1.

The pH of the aqueous siliane modified metal oxide dispersion was adjusted to 10 with ammonium hydroxide, and the zeta potential and mean volume particle size (mv) were measured. The zeta potential was found to be 29 mV, and the mean volume particle size (mv) was found to be 43 nm. The counterion could also be changed, for example, to acetate by passing the sample through an appropriate ion exchange column or using other known methods. As these results show, the silane modified metal oxide having an attached quaternary ammonium group formed a good aqueous dispersion at a pH of 10, and the large positive zeta potential indicates that this silane modified metal oxide is positively charged at this pH value.

In addition, the sample of the aqueous silane modified metal oxide dispersion was aged at pH 8.1 for 115 days at room temperature and then adjusted to pH values of 3, 6 and 10 with ammonium hydroxide and nitric acid as needed. The zeta potentials and particle sizes were measured, and the results are shown in Table 17 below.

TABLE 17

|  | pH = 3 aged | pH = 6 aged | pH = 10 aged |
|---|---|---|---|
| zeta potential (mV) | 35 | 42 | 33 |
| particle size (nm) | 42 | 44 | 44 |

These results show that, even after aging, the silane modified metal oxide having an attached quaternary ammonium group remained well dispersed when adjusted to these pH values. Thus, it would be expected that this silane modified metal oxide could be used as an abrasive in a chemical mechanical polishing composition.

Example 14

(3-Aminopropyl)trimethoxysilane (14.53 g) was added to a stirring mixture of 400.1 g (45% solids) Ludox CL-X colloidal silica dispersion (available from Sigma-Aldrich) and 484.8 g of water. The mixture was then heated at 66° C. for 17 hr. The mixture was cooled to room temperature, and a 99 g portion was removed. A 75% solution of (3-acrylamidopropyl)trimethylammonium chloride (2.46 g) in water was added to the portion, and the mixture was heated for 73 hr at 65° C. The resulting aqueous dispersion of a silane modified metal oxide having an attached quaternary ammonium group had a pH of 8.6.

The pH of the aqueous siliane modified metal oxide dispersion was adjusted to 10 with ammonium hydroxide, and the zeta potential and mean volume particle size (mv) were measured. The zeta potential was found to be 19 mV, and the mean volume particle size (mv) was found to be 116 nm. The counterion could also be changed, for example, to acetate by passing the sample through an appropriate ion exchange column or using other known methods. As these results show, the silane modified metal oxide having an attached quaternary ammonium group formed a good aqueous dispersion at a pH of 10, and the large positive zeta potential indicates that this silane modified metal oxide is positively charged at this pH value. Thus, it would be expected that this silane modified metal oxide could be used as an abrasive in a chemical mechanical polishing composition.

Example 15

(3-Aminopropyl)trimethoxysilane (20.07 g) was added to a stirring mixture of 400.1 g (45% solids) Ludox CL-X colloidal silica dispersion (available from Sigma-Aldrich), 484.8 g of water and 359.0 g of methanol. The mixture was then heated at 65° C. for 17 hr. The mixture was cooled to room temperature, and a 116 g portion was removed. A 90% solution of glycidyltrimethylammonium chloride (2.32 g) in water was added to the portion, and the mixture was heated for 5 hr at 65° C. The resulting aqueous dispersion of a silane modified metal oxide having an attached quaternary ammonium group had a pH of 10.0.

The pH of the aqueous siliane modified metal oxide dispersion was adjusted to 10 with ammonium hydroxide, and the zeta potential and mean volume particle size (mv) were measured. The zeta potential was found to be 22 mV, and the mean volume particle size (mv) was found to be 222 nm. The counterion could also be changed, for example, to acetate by passing the sample through an appropriate ion exchange column or using other known methods. As these results show, the silane modified metal oxide having an attached quaternary ammonium group formed a good aqueous dispersion at a pH of 10, and the large positive zeta potential indicates that this silane modified metal oxide is positively charged at this pH value. Thus, it would be expected that this silane modified metal oxide could be used as an abrasive in a chemical mechanical polishing composition.

Example 16

As described in Examples 1-15, it would be expected that each of the silane modified metal oxides could be used as an abrasive in a chemical mechanical polishing composition.

In particular, the silane modified metal oxides of Examples 1-15 could be used to form a CMP slurry comprising 5 wt % (solids basis) of the modified silica, 4% hydrogen peroxide, 0.018% ferric nitrate nonahydrate, 0.014% malonic acid, and 0.042% pyrazine, with the balance being water. The pH could be adjusted to 2.3 with nitric acid or ammonium hydroxide, as needed, and the resulting slurry could be used for polishing patterned tungsten wafers.

In addition, the silane modified metal oxides of Examples 1-15 could be used to form a CMP slurry comprising 3 wt % (solids basis) of the modified silica, 1% hydrogen peroxide, 0.1% benzotriazole, and 0.5% tricine, with the balance being water. The pH could be adjusted to 4.1 with nitric acid or ammonium hydroxide, as needed, and the resulting slurry could be used for polishing copper.

Also, the silane modified metal oxides of Examples 1-15 could be used to form a CMP slurry comprising 6 parts (solids basis) of the modified silica, 10 parts ethanol, 0.5 part hydrogen peroxide, 0.1 part benzotriazole, 0.5 part malonic acid, and 90 parts water. The pH could be adjusted to 4.1 with nitric acid or ammonium hydroxide, as needed, and the resulting slurry could be used for polishing copper.

The foregoing description of preferred embodiments of the present invention has been presented for the purposes of illustration and description. It is not intended to be exhaustive or to limit the invention to the precise form disclosed. Modifications and variations are possible in light of the above teachings, or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A chemical mechanical polishing composition comprising at least one silane modified metal oxide, wherein the silane modified metal oxide comprises a metal oxide having attached at least one non-zwitterionic silyl group having the formula $Si(X)_n[(R''-HET)_mL-(R-I)]_{3-n}$, wherein X, which can independently be the same or different, is —OH, a hydrolyzable substituent, a non-hydrolyzable substituent, or an oxygen-containing substituent having the formula —O-G- wherein G is a Si of a silicon-containing group or a surface metal atom of the metal oxide; R and R'' are independently a branched or unbranched alkylene, alkenylene, or alkynylene group or an arylene, heteroarylene, alkylarylene; or arylalkylene group; HET is a heteroatom group selected from O, S, NH, or NR'; L is a linking group; m is 0, 1, 2, 3, 4, 5, or 6; n is 0, 1, or 2; and
   a) when m=0, I is —NHSO$_3^-$M$^+$ or —NR'SO$_3^-$M$^+$,
   b) when m≥1 and HET is O then I is a —OSO$_3^-$M$^+$, —SSO$_3^-$M$^+$, —NHSO$_3^-$M$^+$, —NR'SO$_3^-$M$^+$, or —Q$^+$A- group,
   c) when m≥1 and HET is NH or NR' then I is a —OSO$_3$-M$^+$, —SSO$_3$-M$^+$, —NHSO$_3$-M$^+$, —NR'SO$_3$-M$^+$, or —Q$^+$A- group, and
   d) when m≥1 and HET is S, then I is a —SO$_3^-$M$^+$, —OSO$_3^-$M$^+$, —SSO$_3^-$M$^+$, —NHSO$_3^-$M$^+$, —NR'SO$_3^-$M$^+$, or —Q$^+$A$^-$ group;
   wherein R', which can be the same or different, is a branched or unbranched, substituted or unsubstituted alkyl, alkenyl or alkynyl group or a substituted or unsubstituted aryl, heteroaryl, alkylaryl; or arylalkyl group, Q$^+$ is a heteroaromatic quaternary ammonium group, M$^+$ is a cationic counterion, and A$^-$ is a anionic counterion.

2. The chemical mechanical polishing composition of claim 1, wherein HET is S or O.

3. The chemical mechanical polishing composition of claim 1, wherein m is 1, 2, 3, 4, 5, or 6 and HET is NR' and I is a Q$^+$A- group.

4. The chemical mechanical polishing composition of claim 1, wherein HET is NR' and I is a —OSO$_3^-$M$^+$, —SSO$_3^-$M$^+$, —NHSO$_3^-$M$^+$ or —NR'SO$_3^-$M$^+$ group.

5. The chemical mechanical polishing composition of claim 1, wherein L is a bond or a —CO—, —CONR'—, —SO$_3$—, —SO$_2$—, —SO$_2$NR'—, —CH$_2$CH$_2$CO—, —CH$_2$CH$_2$COO—, —CH$_2$CH$_2$CONR'—, or —CH$_2$CH (OH)— group.

6. The chemical mechanical polishing composition of claim 1, wherein m is 0 and L is a bond.

7. The chemical mechanical polishing composition of claim 1, wherein the silane modified metal oxide is the combination product of a metal oxide having at least one surface metal hydroxide and at least one silane compound having the formula
   $Y-Si(X)_n[(R''-HET)_mL-(R-I)]_{3-n}$ and partially hydrolyzed derivatives thereof, wherein X', which can independently be the same or different, is —OH, a hydrolyzable substituent, a non-hydrolyzable substituent, or an oxygen-containing substituent, and Y is —OH or a hydrolyzable substituent.

8. The chemical mechanical polishing composition of claim 1, wherein the silane modified metal oxide is the combination product of a metal oxide having at least one surface metal hydroxide and at least one precursor silane compound having the formula $Y-Si(X)_n[(R''-HET)_mL-(R-Z)]_{3-n}$ and partially hydrolyzed derivatives thereof, which is subsequently reacted to form the silane modified metal oxide, wherein X', which can independently be the same or different, is —OH, a hydrolyzable substituent, a non-hydrolyzable substituent, or an oxygen-containing substituent, Y is —OH or a hydrolyzable substituent, and Z is a halogen, a thiol group, or an amino group.

9. The chemical mechanical polishing composition of claim 1, wherein the silane modified metal oxide is the combination product of a metal oxide having at least one surface metal hydroxide and at least one precursor silane compound having the formula Y—Si(X)$_n$[(R"-HET)$_m$H]$_{3-n}$ and partially hydrolyzed derivatives thereof, which is subsequently reacted with a compound having the formula Z'—(R—I) to form the silane modified metal oxide, wherein X', which can independently be the same or different, is —OH, a hydrolyzable substituent, a non-hydrolyzable substituent, or an oxygen-containing substituent, Y is —OH or a hydrolyzable substituent, m is not 0, and Z' is an electrophilic group.

10. The chemical mechanical polishing composition of claim 1, wherein the silane modified metal oxide is the combination product of a metal oxide having at least one surface metal hydroxide and at least one precursor silane compound having the formula Y—Si(X')$_n$(R"—Z")$_{3-n}$ and partially hydrolyzed derivatives thereof, which is subsequently reacted with a compound having the formula H-(HET-L-R—I) to form the silane modified metal oxide, wherein X', which can independently be the same or different, is —OH, a hydrolyzable substituent, a non-hydrolyzable substituent, or an oxygen-containing substituent, Y is —OH or a hydrolyzable substituent, and Z" is an electrophilic group.

11. The chemical mechanical polishing composition of claim 1, wherein I is a SO$_3^-$M$^+$ group.

12. The chemical mechanical polishing composition of claim 1, wherein I is a —SSO$_3^-$M$^+$ group.

13. The chemical mechanical polishing composition of claim 1, wherein I is a —NHSO$_3^-$M$^+$ or —NR'SO$_3^-$M$^+$ group.

14. The chemical mechanical polishing composition of claim 1, wherein I is a -Q$^+$A$^-$ group.

15. The chemical mechanical polishing composition of claim 1, wherein the metal oxide is alumina, titania, zirconia, germania, silica, ceria, tantalum oxide, mixtures thereof, and chemical admixtures thereof.

16. The chemical mechanical polishing composition of claim 1, wherein the metal oxide is fumed silica, colloidal silica, precipitated silica, silica gel, or silica aerogel.

17. The chemical mechanical polishing composition of claim 1, wherein the metal oxide is fumed silica or colloidal silica.

18. The chemical mechanical polishing composition of claim 1, wherein the chemical mechanical polishing composition is a dispersion comprising at least one aqueous vehicle.

19. The chemical mechanical polishing composition of claim 18, wherein the aqueous vehicle is water.

20. The chemical mechanical polishing composition of claim 1, wherein the chemical mechanical polishing composition has a pH of from 2 to 11.

21. The chemical mechanical polishing composition of claim 20, wherein the pH is from 3 to 10.

22. The chemical mechanical polishing composition of claim 20, wherein the chemical mechanical polishing composition has a pH of from 2 to 8.

* * * * *